(12) United States Patent
Durham et al.

(10) Patent No.: US 10,395,658 B2
(45) Date of Patent: Aug. 27, 2019

(54) PRE-PROCESSING PARTIAL INPUTS FOR ACCELERATING AUTOMATIC DIALOG RESPONSE

(71) Applicant: INTERNATIONAL BUSINESS MACHINES CORPORATION, Armonk, NY (US)

(72) Inventors: Christopher M. Durham, Austin, TX (US); Anne E. Gattiker, Austin, TX (US); Thomas S. Hubregtsen, Hassfurt (DE); Inseok Hwang, Austin, TX (US); Jinho Lee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 15/601,542

(22) Filed: May 22, 2017

(65) Prior Publication Data
US 2018/0336903 A1    Nov. 22, 2018

(51) Int. Cl.
G10L 15/22   (2006.01)
G10L 17/02   (2013.01)
G10L 25/27   (2013.01)
G10L 15/18   (2013.01)
G10L 15/28   (2013.01)
(Continued)

(52) U.S. Cl.
CPC ............ *G10L 17/02* (2013.01); *G06F 17/279* (2013.01); *G06F 17/2785* (2013.01); *G06F 17/2881* (2013.01); *G10L 15/1822* (2013.01); *G10L 15/22* (2013.01); *G10L 15/28* (2013.01); *G10L 25/27* (2013.01)

(58) Field of Classification Search
None
See application file for complete search history.

(56) References Cited

U.S. PATENT DOCUMENTS 6,961,694 B2   11/2005   Schmid et al.
7,437,291 B1   10/2008   Stewart et al.
(Continued)

OTHER PUBLICATIONS

Ishii, et al., "Tangible Bits: Towards Seamless Interfaces between People, Bits and Atoms," Proceedings of CHI '97, Mar. 22-27, 1997, pp. 1-8.
(Continued)

*Primary Examiner* — Abul K Azad
(74) *Attorney, Agent, or Firm* — Conley Rose, P.C.

(57) ABSTRACT

An apparatus comprising a memory and a processor coupled to the memory. The processor receives input from a user, processes a first portion of the input via more than one service module while receiving a second portion of the input to determine a first speculative result, wherein processing the first portion of the input comprises executing at least one service module coupled to a corresponding speculation buffer, processes a second portion of the input via the more than one service module to determine a second speculative result, wherein processing the second portion of the input comprises executing the at least one service module coupled to the corresponding speculation buffer, processes the input via the more than one service module to determine a final output, wherein processing the input comprises executing the at least one service module coupled to the corresponding speculation buffer, and outputs the final output to the user.

19 Claims, 6 Drawing Sheets

(51) Int. Cl.
    *G06F 17/27* (2006.01)
    *G06F 17/28* (2006.01)

(56) References Cited

U.S. PATENT DOCUMENTS

| | | | |
|---|---|---|---|
| 7,729,904 | B2 | 6/2010 | Bennett |
| 7,729,912 | B1 | 6/2010 | Bacchiani et al. |
| 8,355,484 | B2 | 1/2013 | Eide et al. |
| 9,117,447 | B2 | 8/2015 | Gruber et al. |
| 9,122,745 | B2 | 9/2015 | Akolkar et al. |
| 2003/0220799 | A1* | 11/2003 | Kim .................. G10L 15/22 704/277 |
| 2017/0068513 | A1* | 3/2017 | Stasior ................ G06F 3/167 |

OTHER PUBLICATIONS

Weiser, "The Computer of the 21st Century," Mobile Computing and Communications Review, vol. 3, No. 3, pp. 3-11.

Abowd, et al., "Charting Past, Present, and Future Research in Ubiquitous Computing," ACM Transactions on Computer-Human Interaction, vol. 7, No. 1, Mar. 2000, pp. 29-58.

Myers, et al., "Past, Present, and Future of User Interface Software Tools," ACM Transactions on Computer-Human Interaction, vol. 7, No. 1, Mar. 2000, pp. 3-28.

"Google Home" http://web.archive.org/web/20161222013323/https://madeby.google.com/home/, downloaded from the internet Sep. 19, 2017, 11 pages.

"Hey Siri, what's the best sushi place in town?," iOS—Siri—Apple, http://web.archive.org/web/20161220192406/http://www.apple.com/ios/siri/, downloaded from the Internet Sep. 19, 2017, 7 pages.

Karat, et al., "Conversational Interface Technologies," The Human-Computer Interaction Handbook, L. Erlbaum Associates Inc., 2002, pp. 169-186.

Jeon, et al., "Robot-based augmentative and alternative communication for nonverbal children with communication disorders," in Proceedings of the 2014 ACM International Joint Conference on Pervasive and Ubiquitous Computing. ACM, 2014, pp. 853-859.

Hwang, et al., "Talkbetter: family-driven mobile intervention care for children with language delay," in Proceedings of be 17th ACM conference on Computer supported cooperative work & social computing. ACM, 2014, pp. 1283-1296.

Lee, et al., "Sociophone: Everyday face-to-face interaction monitoring platform using multi-phone sensor fusion," in Proceeding of the 11th annual international conference on Mobile systems, applications, and services. ACM, 2013, pp. 375-388.

Hoque, et al., "Mach: My automated conversation coach," in Proceedings of the 2013 ACM international joint conference on Pervasive and ubiquitous computing. ACM, 2013, pp. 697-706.

Kang, et al., "Zaturi: We put together the 25th hour for you. create a book for your baby," in Proceedings of the 20th ACM conference on Computer supported cooperative work & social computing. ACM, 2017.

Trinh, et al., "Dynamicduo: co-presenting with virtual agents," in Proceedings of the 33rd Annual ACM Conference on Human Factors in Computing Systems. ACM, 2015, pp. 1739-1748.

IBM Watson. Accessed: Dec. 18, 2016. [Online]. Available: https://www.ibm.com/watson/; downloaded from the Internet Sep. 19, 2017, 7 pages.

Microsoft cognitive services. Accessed: Jan. 4, 2017. [Online]. Available: https://www.microsoft.com/cognitive-services/en-us/; downloaded from the Internet Sep. 19, 2017, 6 pages.

Watson speech-to-text. Accessed: Dec. 18, 2016. [Online]. Available: https://www.ibm.com/watson/developercloud/speech-to-text.html; downloaded from the Internet Sep. 19, 2017, 3 pages.

Watson conversation. Accessed: Dec. 18, 2016. [Online]. Available:https://www.ibm.com/watson/developercloud/conversation.html, downloaded from the Internet Sep. 19, 2017, 3 pages.

Watson tone analyzer. Accessed: Dec. 18, 2016. [Online]. Available: https://www.ibm.com/watson/developercloud/tone-analyzer.html, downloaded from the Internet Sep. 19, 2017, 3 pages.

Watson text-to-speech. Accessed: Dec. 18, 2016. [Online]. Available: https://www.ibm.com/watson/developercloud/text-to-speech.html, downloaded from the Internet Sep. 19, 2017, 3 pages.

Ghigi, et al., "Incremental dialog processing in a task-oriented dialog." in Interspeech, 2014, pp. 308-312.

Heintze, et al., "Comparing local and sequential models for statistical incremental natural language understanding," in Proceedings of the 11th Annual Meeting of the Special Interest Group on Discourse and Dialogue. Association for Computational Linguistics, 2010, pp. 9-16.

Skantze, et al., "Incremental dialogue processing in a microdomain," in Proceedings of the 12th Conference of the European Chapter of the Association for Computational Linguistics. Association for Computational Linguistics, 2009, pp. 745-753.

Lee et al., "Memory-aware mapping and scheduling of tasks and communications on many-core SoC," in Proceedings of the Asia and South Pacific Design Automation Conference, 2012, pp. 419-424.

Lee, et al., "Mapping and scheduling of tasks and communications on many-core soc under local memory constraint," IEEE Transactions on Computer-Aided Design of Integrated Circuits and Systems, vol. 32, No. 11, pp. 1748-1761, 2013.

Rau, "Iterative modulo scheduling: An algorithm for software pipelining loops," in Proceedings of the International Symposium on Microarchitecture. ACM, 1994, pp. 63-74.

Eriksson et al. "Integrated modulo scheduling for clustered vliw architectures," in International Conference on High Performance Embedded Architectures and Compilers. Springer, 2009, pp. 65-79.

Google cloud speech API. Accessed: Dec. 21, 2016. [Online]. Available:https://cloud.google.com/speech/, downloaded from the Internet Sep. 19, 2017, 4 pages.

Bing speech APIs. Accessed: Jan. 4, 2017. [Online]. Available: https://www.microsoft.com/cognitive-services/en-us/speech-api, downloaded from the Internet Sep. 19, 2017, 4 pages.

Corro, et al., "Clausie: clause-based open information extraction," in Proceedings of the 22nd international conference on World Wide Web. ACM, 2013, pp. 355-366.

Han,et al., "Nlify: lightweight spoken natural language interfaces via exhaustive paraphrasing," in Proceedings of the 2013 ACM international joint conference on Pervasive and ubiquitous computing. ACM, 2013, pp. 429-438.

Watson personality insights. Accessed: Jan. 5, 2017. [Online]. Available: https://www.ibm.com/watson/developercloud/personality-insights.html, downloaded from the Internet Sep. 19, 2017, 3 pages.

Watson translator. Accessed: Jan. 5, 2017. [Online]. Available: https://www.ibm.com/watson/developercloud/language-translator.html, downloaded from the Internet Sep. 19, 2017, 6 pages.

Microsoft translator API. Accessed: Jan. 4, 2017. [Online]. Available: https://www.microsoft.com/cognitive-services/en-us/translator-api, downloaded from the Internet Sep. 19, 2017, 4 pages.

Google cloud translation API. Accessed: Jan. 5, 2017. [Online]. Available: https://cloud.google.com/translate/, downloaded from the Internet Sep. 19, 2017, 4 pages.

Watson dialog. Accessed: Dec. 18, 2016. [Online]. Available: https://www.ibm.com/watson/developercloud/dialog.html, downloaded from the Internet Sep. 19, 2017, 3 pages.

Lee, et al., "SCI-FII: Speculative Conversational Interface Framework for Incremental Inference on Modularized Services," 18th IEEE International Conference on Mobile Data Management (MDM), 2017, 8 pages.

Sagae, et al., "Towards Natural Language Understanding of Partial Speech Recognition Results in Dialogue Systems," Proceeding NAACL-Short '09 Proceedings of Human Language Technologies: The 2009 Annual Conference of the North American Chapter of the Association for Computational Linguistics, Companion Volume: Short Papers pp. 53-56, Boulder, Colorado, May 31-Jun. 5, 2009.

Anonymously; "Method and Apparatus to Support Auto-Switch from Virtual Agent to Human Agent in Call Center"; http://ip.com/IPCOM/000249109D; 5 pages, Feb. 7, 2017.

(56) References Cited

OTHER PUBLICATIONS

Anonymously; "System and Method for Question Selection of Dialog System"; http://ip.com/IPCOM/000237777D; 3 pages, Jul. 10, 2014.
Lasecki, W. et al.; "Real-time Captioning by Groups of Non-Experts"; UIST'12; Oct. 7-10, 2012.

* cited by examiner

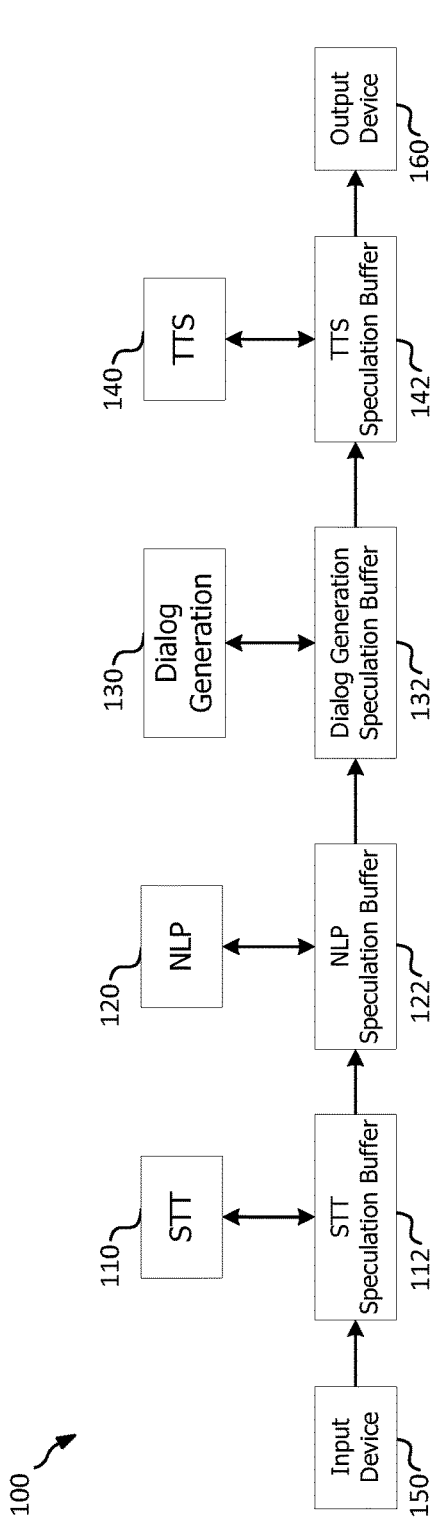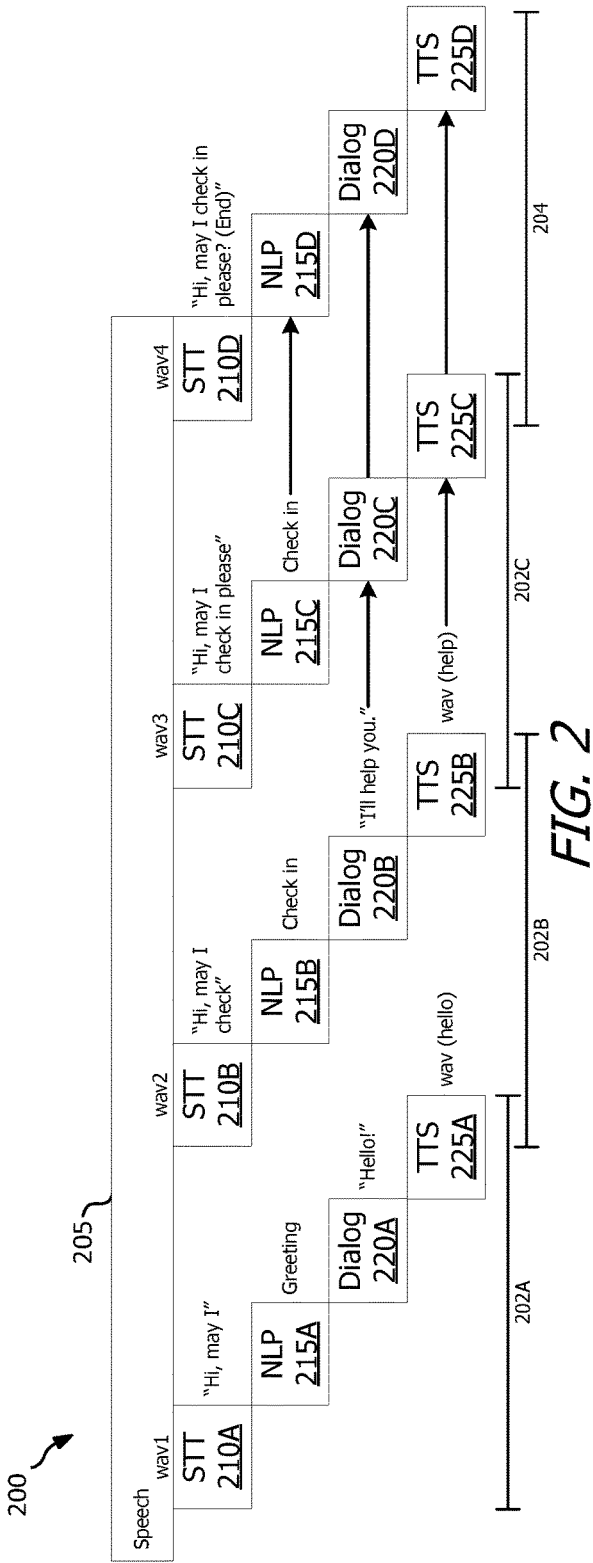

```
Speculative_exe (input, stage) :
  if input == tmpBuf.input
      return
  tmpBuf.in_progress = true
  tmpBuf.input = input
  output = stage.run(input)
  tmpbuf.output = output
  tmpBuf.in_progress = false
  if stage.is_last
      return
  else
      thread_start (Speculative_exe, output, stage.next)
Final_exe (input, stage) :
  if input == tmpBuf.input
      while(tmpBuf.in_progress == true)
      output = tmpbuf.output
  else
      output = stage.run(input)
      stage.commit(output)
  if stage.is_last
      inform_user(output)
  else
      Final_exe (output, stage.next)
```

FIG. 3

PRE-PROCESSING PARTIAL INPUTS FOR ACCELERATING AUTOMATIC DIALOG RESPONSE

BACKGROUND

The present disclosure relates to the field of natural language processing, and more specifically to generating and providing a dialog response to a user based at least in part on processing performed while the user is still speaking.

Advances in cognitive computing and natural language processing enable computer systems to interact with humans in a conversational, or human-like, manner. These systems may receive speech from a user as input, process the speech to determine an appropriate response, and output the response to the user. However, because of limitations in the abilities of these computer systems, a delay may exist between an end of the user's speech and the computer system providing the response to the user. Such a delay may degrade the user experience by increasing an amount of time incurred by the user in interacting with the computer system and delaying resolution of the user's query when the user is seeking information. The delay may also make the interaction between the computer system and the user less human-like.

SUMMARY

Various embodiments presented herein mitigate the delay suffered by currently existing computer systems in responding to user input by performing speculative processing (which may also be referred to as pre-processing and/or pre-fetching) responses to the user input according to portions of the user input analyzed prior to the computer system receiving an entirety of the user input.

In an embodiment of the present disclosure, an apparatus comprising a memory and a processor coupled to the memory. The processor is configured to receive an input from a user, process a first portion of the input via more than one service module while receiving a second portion of the input to determine a first speculative result, wherein processing the first portion of the input comprises executing at least one service module coupled to a corresponding speculation buffer, process a second portion of the input via the more than one service module to determine a second speculative result, wherein processing the second portion of the input comprises executing the at least one service module coupled to the corresponding speculation buffer, process the input via the more than one modular service to determine a final output, wherein processing the input comprises executing the at least one service module coupled to the corresponding speculation buffer, and output the final output to the user.

Optionally, the input is a verbal input and processing the first portion of the verbal input comprises determining a first transcript of the first portion of the verbal input according to speech-to-text processing, determining a first intent expressed in the first transcript of the first portion of the verbal input according to natural language processing, generating a first dialog response corresponding to the first intent expressed in the transcript of the first portion of the verbal input according to dialog response generation, and generating a first speculative output according to the first dialog response. Optionally, the input is at least one of verbal input, visual input, or text input. Optionally, processing the second portion of the verbal input comprises determining a second transcript of the second portion of the verbal input according to speech-to-text processing determining a second intent expressed in the second transcript of the second portion of the verbal input according to natural language processing generating a second dialog response corresponding to the second intent expressed in the transcript of the second portion of the verbal input according to dialog response generation when the first intent does not match the second intent using the first dialog response as the second dialog response when the first intent matches the second intent, and generating a second speculative output according to the second dialog response. Optionally, the first speculative output is used as the second speculative output when the first dialog response is the same as the second dialog response. Optionally, the second speculative output is used as the final output. Optionally, processing the verbal input to determine a final result comprises determining a final transcript of the verbal input according to speech-to-text processing after an entirety of the verbal input is received, determining a final intent expressed in the final transcript of the verbal input according to natural language processing when the final transcript does not match the second transcript, using the second intent as the final intent when the final transcript matches the second transcript, generating a final dialog response corresponding to the final intent expressed in the final transcript of the verbal input according to dialog response generation when the final intent does not match the second intent, using the second dialog response as the final dialog response when the second intent matches the final intent, and generating the final output according to the final dialog response.

In another embodiment of the present disclosure, a computer-implemented method comprising obtaining a speech-to-text (STT) result, providing the STT result as input to a next stage of a speculative processing system, determining whether the input exists in a speculation buffer of the next stage, obtaining a speculative processing result corresponding to the input from the speculation buffer when the input exists in the speculation buffer, providing the speculative processing result as a second input to a subsequent stage of the speculative processing system when the input exists in the speculation buffer, processing the input to determine an output when the input does not exist in the speculation buffer, and transmitting the output as an input to the subsequent stage of the speculative processing system when the input exists in the speculation buffer.

Optionally, the method further comprises writing the input to the speculation buffer before processing the input to determine an output when the input does not exist in the speculation buffer. Optionally, the method further comprises writing the output to the speculation buffer before transmitting the output as the input to the subsequent stage of the speculative processing system. Optionally, processing the input to determine the output comprises generating an audio file of a dialog response determined at least in part according to the speculative processing result. Optionally, the subsequent stage of the speculative processing system is an output stage configured to play an audio file when the audio file is the input to the subsequent stage of the speculative processing system. Optionally, the STT result is a partial STT result for a portion of a verbal input provided by a user, and wherein the STT result is obtained prior to a completion of the user providing the verbal input. Optionally, the speculation buffer includes output determined according to processing of a previously received partial STT result.

In yet another embodiment of the present disclosure, a computer program product for performing domain adaptation of a domain, the computer program product comprising a computer readable storage medium having program instructions embodied therewith, the program instructions executable by a processor. Executing the instructions causes the processor to receive an input from a user, perform speech-to-text processing to determine a transcript of the input, perform natural language processing (NLP) to determine an intent expressed by the transcript, determine an output corresponding to the intent and a speculative processing result of a portion of the input, and transmit the output to an output device to cause presentation of the output to the user.

Optionally, the input is a verbal input and executing the program instructions further causes the processor to perform STT processing on the portion of the verbal input to determine a transcript of the portion of the verbal input, perform NLP on the transcript of the portion of the verbal input to determine an intent expressed by the transcript of the portion of the verbal input, generate a dialog response according to the intent expressed by the transcript of the portion of the verbal input, and generate an audio file according to the dialog response. Optionally, determining the output corresponding to the intent and the speculative processing result of the portion of the verbal input comprises using at least one of the intent expressed by the transcript of the portion of the verbal input, the dialog response, or the audio file in determining the output corresponding to the intent. Optionally, executing the program instructions further causes the processor to present the output to the user by playing the audio file via a speaker. Optionally, the input is a verbal input and executing the program instructions further causes the processor to perform second STT processing on a second portion of the verbal input to determine a second transcript of the second portion of the verbal input, perform second NLP on the second transcript of the second portion of the verbal input to determine a second intent expressed by the second transcript of the second portion of the verbal input, generate a second dialog response according to the second intent expressed by the second transcript of the second portion of the verbal input, and generate a second audio file according to the second dialog response. Optionally, determining the output corresponding to the intent and the speculative processing result of the portion of the verbal input comprises using at least one of the second intent expressed by the second transcript of the portion of the verbal input, the second dialog response, or the second audio file in determining the output corresponding to the intent.

BRIEF DESCRIPTION OF THE DRAWINGS

FIG. 1 depicts a block diagram of a system for pre-processing verbal inputs for determining automatic dialog responses in accordance with various embodiments.

FIG. 2 depicts a diagram of speculative processing in accordance with various embodiments.

FIG. 3 depicts instructions for implementing speculative processing in accordance with various embodiments.

DETAILED DESCRIPTION

Figure 4:
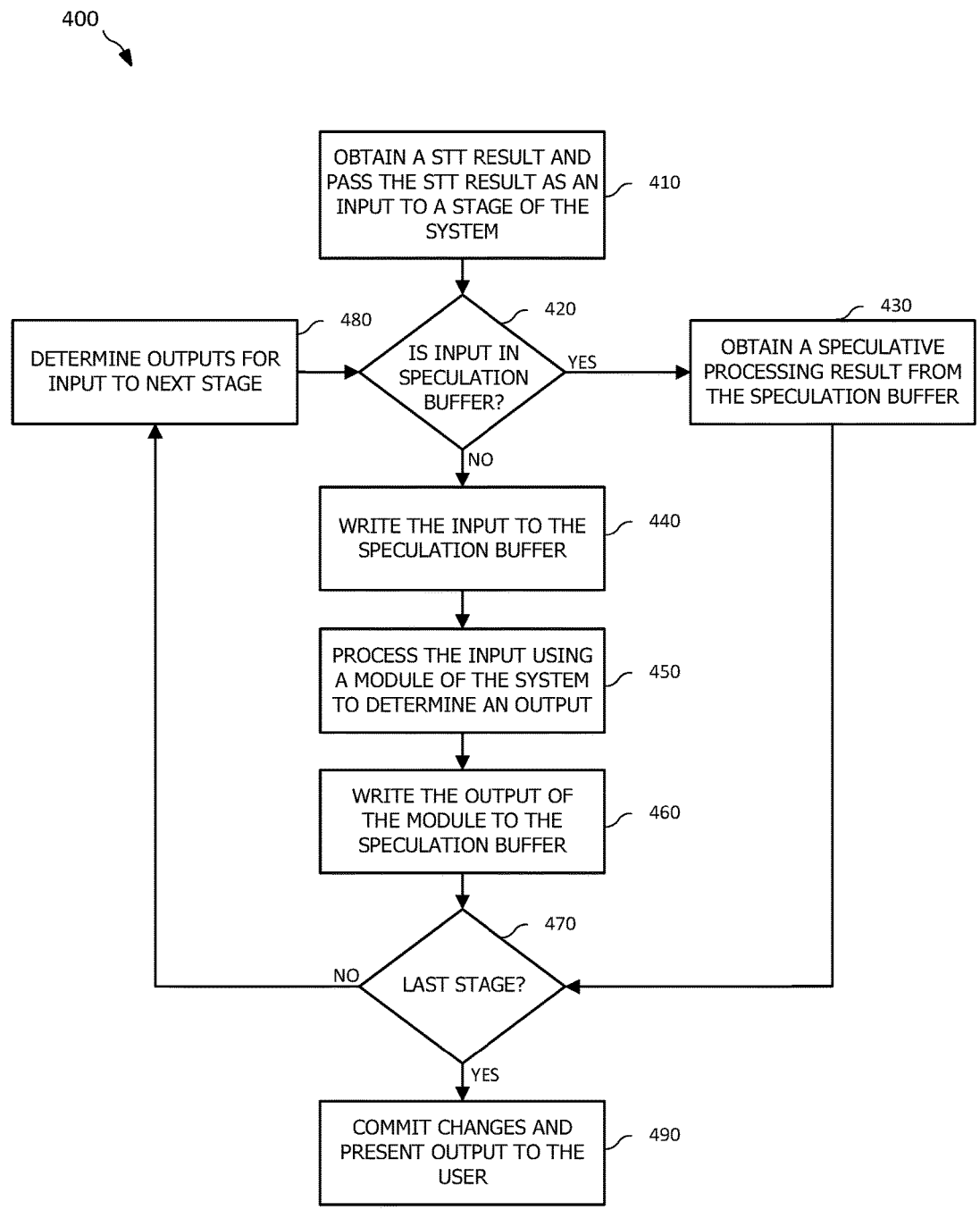
FIG. 4 depicts a flowchart of a method for performing speculative processing in accordance with various embodiments.

Disclosed herein are embodiments that provide for determination and presentation of automatic dialog responses. The automatic dialog responses are determined, in some embodiments, in response to verbal input from a user (e.g., a question) and are presented, in some embodiments, to the user via an output device such as a speaker and/or a graphical user interface visible on a digital monitor or screen. The automatic dialog responses are determined, in at least some embodiments, by pre-processing the verbal input from the user and/or pre-fetching the automatic dialog responses based at least in part on a portion of the verbal input and/or a result of the pre-processing of the verbal input. In some embodiments, the pre-processing and/or pre-fetching may be referred to as speculative processing. For example, the verbal input may be pre-processed by processing at least a portion of the verbal input before receipt of an entirety of the verbal input has concluded. The automatic dialog responses may be pre-fetched by fetching an automatic dialog response associated with the pre-processed verbal input before receipt of an entirety of the verbal input has concluded. In at least some embodiments, pre-processing the verbal inputs and/or pre-fetching the automatic dialog responses enables presentation of the automatic dialog responses to the user from which the verbal input was received more quickly than currently existing methods which may not pre-process the verbal inputs and/or pre-fetch the automatic dialog responses as disclosed herein. Presenting the automatic dialog responses to the user more quickly, in at least some embodiments, provides for an improved user experience for the user and a more conversational system that responds to the user input with a minimal delay between an end of the verbal input and a beginning of the automatic dialog responses, thereby more closely mimicking a human-to-human interaction.

It should be noted that while a verbal input is referred to herein for the sake of simplicity and ease of understanding of the disclosure, in various embodiments the input may be any type of input such as verbal, text-based, video, sign language, braille, or any form of input suitable for conveying information from a user to a computer system. Similarly, while an audio output is referred to herein, in various embodiments the output may be any type of output such as audio, text, video, etc. In each of these embodiments, various modules described herein may be replaced by other modules which may be appropriate for processing the respective type of input and/or output. For example, when the input is a video input (such as, for example, containing sign language characters or words performed by the user), speech to text (STT) module may be replaced by a video analysis module (e.g., such as facial recognition, gesture recognition, etc.) and a text to speech (TTS) module may be replaced by a video generation module (e.g., a gesture generation, etc.).

Referring now to FIG. 1, a block diagram of a system 100 for pre-processing verbal inputs for determining automatic dialog responses in accordance with various embodiments is shown. In at least some embodiments, the system 100 includes a STT module 110, a natural language processing (NLP) module 120, a dialog generation module 130, and a TTS module 140. Each of the STT module 110, NLP module 120, dialog generation module 130, and/or TTS module 140 may be implemented as hardware (e.g., an application specific integrated circuit (ASIC)) and/or as instructions executable by at least one processor (not shown). Such embodiments are described below. The processor may be, for example, a processor in a cloud computing or distributed computing environment. The system 100 also includes an STT speculation buffer 112 coupled to the STT module 110, a NLP speculation buffer 122 coupled to the STT speculation buffer 112 and the NLP module 120, a dialog generation speculation buffer 132 coupled to the NLP speculation buffer 122 and the dialog generation module 130, and a TTS speculation buffer 142 coupled to the dialog generation speculation buffer 132 and the TTS module 140. Each of the speculation buffers may be, for example, a cache memory, a random access memory (RAM), or any other suitable form of data storage. In various embodiments, each of the speculation buffers may store data temporarily (e.g., for only one user interaction) or long-term (e.g., for multiple user interactions). For example, the speculation buffers may store data for a period of time during which the system 100 is interacting with a particular user, for a period of time during which the system 100 is carrying on a particular conversation with the user, or for a period of time encompassing any number interactions and/or conversations with any number of users. In some embodiments, a module and its respective speculation buffer may be referred to as a stage (e.g., a speculative processing stage) of the system 100 and a speculative execution stage (e.g., an entire speculative operation from receiving an input to determination of a speculative result) may include one or more speculative processing stages.

In some embodiments, each speculative processing stage in the system 100 may subscribe to an output of a module of a preceding speculative processing stage, in addition to being coupled to a speculation buffer of the preceding speculative processing stage as described above. For example, a speculative processing stage containing the NLP module 120 and the NLP speculation buffer 122 may subscribe to an output of the STT module 110 in addition to being coupled to the STT speculation buffer 112. When an amount of the output of the module of the preceding speculative processing stage that is updated by the module exceeds a threshold, the subsequent speculative processing stage which has subscribed to the output of the module of the preceding speculative processing stage may trigger itself to begin processing. For example, when an amount of output of the STT module 110 that is updated exceeds a threshold, the speculative processing stage containing the NLP module 120 and the NLP speculation buffer 122 may trigger itself to begin processing the output of the STT module 110 prior to the STT module 110 completing formation or generation of its output. The threshold for triggering based on an output of the STT module 110 may be, for example, a number of new or additional words added to a transcript generated by the STT module 110, a number of word swaps (e.g., correction(s) to a transcript previously generated by the STT module 110), etc. Similarly, the threshold for triggering based on an output of the NLP module 120 may be a number of states (e.g., such as a number of highest confidence ranked states) that have changed in determining the intent of the transcript and a threshold for triggering based on an output of the dialog generation module 130 may be a response being generated by the dialog generation module 130 necessitating a different audio file than what has been previously generated and stored by the dialog generation module 130.

The STT module 110 is configured to convert received audio into text. For example, the STT module 110 may receive an audio file of a user interacting with the system 100 and generate a transcript of the user's speech received by the system 110. Both the input, and the output, of the STT module 110 may be stored together in the STT speculation buffer 112. The NLP module 120 is configured to determine an intent of the user's speech received by the system 110. For example, the NLP module 120 may determine the intent of the user's speech by performing processing and/or analysis on the transcript generated by the STT module 110. Both the input, and the output, of the NLP module 120 may be stored together in the NLP speculation buffer 122. The dialog generation module 130 is configured to determine a dialog response according to the intent of the user's speech determined by the NLP module 120. For example, the dialog response may be soliciting additional information from the user, offering to assist the user, or providing requested information to the user. Both the input, and the output, of the dialog generation module 130 may be stored together in the dialog generation speculation buffer 132. The TTS module 140 is configured to generate (e.g., synthesize) an audio output file from the dialog response determined by the dialog generation module 130. Both the input, and the output, of the TTS module 140 may be stored together in the TTS speculation buffer 142.

In various embodiments, the system 100 may include additional modules (not shown), each of which may be coupled to an associated speculation buffer. For example, the system 100 may include modules that provide for emotion or tone analysis, facial recognition, retrieval of external data (such as weather, maps, social media content, data management, data storage and/or retrieval, etc.). In some embodiments, the system 100 further includes, or is communicatively coupled to, an input device 150 and an output device 160. For example, the input device 150 may be a microphone which is communicatively coupled to the STT speculation buffer 112 and the output device 160 may be a speaker communicatively coupled to the TTS speculation buffer 142. In other embodiments, the output device 160 may be a display screen, monitor, touchscreen, or other form of visual interaction based device, in which case the system 100 may include one or more modules for providing the output device 160 with visual content for outputting via the visual interaction based device.

In various embodiments, at least some components of the system 100 may be located separately from a remainder of the components of the system 100. For example, in some embodiments, the input device 150 and the output device 160 (as well as, in some embodiments, additional processing, network connectivity, and/or storage components) may be located at a first location (e.g., a user-facing location at which the user directly interacts with the system 100). The STT module 110, STT speculation buffer 112, NLP module 120, NLP speculation buffer 122, dialog generation module 130, dialog generation speculation buffer 132, TTS module 140, and/or TTS speculation buffer 142 may be located at a second location (e.g., one or more servers located proximate to the first location, such as within a same building or complex of buildings, and/or one or more servers geographically separated from the first location and coupled to the first location via a network such as the Internet).

In some embodiments, any one or more components of the system 100 may be provided by any one or more vendors or providers as a modular service (e.g., such that a service module of the vendor is made available for use by the system 100). For example, a first vendor may provide one or more of the STT module 110, NLP module 120, dialog generation module 130, and/or TTS module 140 and a second vendor may provide one or more other of the STT module 110, NLP module 120, dialog generation module 130, and/or TTS module 140. The STT speculation buffer 112, NLP speculation buffer 122, dialog generation speculation buffer 132, and/or TTS speculation buffer 142 may be provided by a singular middleware vendor communicatively positioned between the a client and the vendor(s) providing the STT module 110, NLP module 120, dialog generation module 130, and/or TTS module 140, may be provided along with a respective module by each vendor, may be implemented by the client, or any combination thereof. The client may access the various service modules provided by the vendor(s) by issuing application programming interface (API) calls to the modules to perform a task and provide an output. For example, the client may utilize modules of any of one or more vendors to create a system which provides a performance that is optimal for a desired operation or implementation of the client.

When the system 100 receives verbal input from a user, the system 100 is configured to automatically generate and present a dialog response to the user. For example, the system 100 may be implemented as an automated check-in system. When a user approaches the system 100 (or a portion of the system 100 when the system 100 is implemented in more than one location, as discussed above), the user may query the system 100 for assistance. For example, the user may approach the system 100 and state "Hi, may I check in, please?" The system 100 receives the user's statement as verbal input, for example, via the input device 150. In some embodiments, the verbal input is stored in the STT speculation buffer 112 as an audio file. In some embodiments, the verbal input is stored as a single audio file in the STT speculation buffer 112, while in other embodiments the verbal input may be stored as multiple audio files, where each audio file includes various portions of the verbal input for pre-processing and/or pre-fetching an automatic dialog response based on the portion of the verbal input. For example, the above exemplary verbal input may be stored in three portions; a first portion including "Hi, may I", a second portion including "Hi, may I check", and a third portion including "Hi, may I check in, please?"

In some embodiments, each saved portion of the verbal input is passed from the STT speculation buffer 112 to the STT module 110 for conversion from the audio file to a transcript of the audio file (e.g., a text-based representation of the user's speech contained within the audio file). The transcript is then passed from the STT module 110 back to the STT speculation buffer 112 for storage by the STT speculation buffer 112. In some embodiments, the transcript is associated with the audio file in the STT speculation buffer 112 such that the audio file and the transcript form an input-output data pair. The transcript of the verbal input may then be output by the STT speculation buffer 112 to the NLP speculation buffer 122 for further processing by the system 100 for generation of the automatic dialog response. In some embodiments, a transcript of a portion of the verbal input may be output by the STT speculation buffer 112 prior to the system 100 receiving an entirety of the verbal input, thereby enabling pre-processing and pre-fetching the automatic dialog response based on the portion of the verbal input and accelerating presentation of the automatic dialog response to the user. In other embodiments, when an input-output data pair exists in the STT speculation buffer 112 for a verbal input (e.g., as a result of a previous interaction between a user and the system 100), the STT speculation buffer 112 may output the transcript of the verbal input to the NLP speculation buffer 122 without outputting the audio file to the STT module 110 for processing. In this way, in some embodiments redundant processing of verbal input for which a transcript is already available may be minimized.

Upon receipt of the transcript of the verbal input from the STT speculation buffer 112, the NLP speculation buffer 122 stores the transcript and determines whether an intent associated with the transcript has been previously determined by the system 100 and stored in the NLP speculation buffer 122. When the transcript matches an input of an input-output data pair of the NLP speculation buffer 122, a buffer hit may occur, and the output of the input-output pair stored in the speculation buffer 122 may be output to the dialog generation speculation buffer 132 without processing of the transcript by the NLP module 120. For example, if the NLP module 120 has previously determined an intent for a transcript of a portion of the verbal input of the first user and the system 100 determines that the transcript for a subsequent portion of the verbal input of the first user is the same or substantially the same (e.g., such as when keywords of the transcripts are the same but ancillary words such as "hi", "please", etc. are, or are not, present), it may be unnecessary for the NLP module 120 to also determine an intent for the transcript of subsequent portion of the verbal input of the first user. As another example, if a first user has interacted with the system 100 to check-in for some offering and a second user begins interacting with the system 100 to also check-in for some offering, the NLP module 120 may have previously determined an intent for a transcript of verbal input of the first user. As such, it may be unnecessary for the NLP module 120 to also determine an intent for a transcript of a verbal input of the second user when the transcript of the first user and the second user are the same, or substantially the same (e.g., such as when keywords of the transcripts are the same but ancillary words such as "hi", "please", etc. are, or are not, present).

When the transcript does not match an input of an input-output pair stored in the NLP speculation buffer 122, a buffer miss may occur, and the NLP speculation buffer 122 may pass the transcript to the NLP module 120 for processing by the NLP module 120. The NLP module 120 processes the transcript to determine an intent of the user (e.g., as expressed by the content of the transcript). For example, for the first portion of the verbal input shown above (e.g., "Hi, may I"), the NLP module 120 may determine an intent of the user is to issue a greeting. However, for the second and third portions of the verbal input shown above (e.g., "Hi, may I check" and "Hi, may I check in, please?"), the NLP module 120 may determine that an intent of the user is to check in to an offering using the system 100. The NLP module 120 determines the intent, in some embodiments, using any suitable natural language classification (NLC) and/or NLP process or processes, a scope of which is not limited herein. After determining the intent, the NLP module 120 passes the intent back to the NLP speculation buffer 122 for storage by the NLP speculation buffer 122. In some embodiments, the intent is associated with the transcript in the NLP speculation buffer 122 such that that the transcript and the intent form an input-output data pair. The intent expressed by the transcript may then be output by the NLP speculation buffer 122 to the dialog generation speculation buffer 132 for further processing by the system 100 for generation of the automatic dialog response.

Upon receipt of the intent expressed by the transcript from the NLP speculation buffer 122, the dialog generation speculation buffer 132 stores the intent and determines whether a dialog response associated with the intent has been previously generated by the system 100 and stored in the dialog generation speculation buffer 132. When the intent matches an input of an input-output data pair of the dialog generation speculation buffer 132, a buffer hit may occur and the output of the input-output pair stored in the dialog generation speculation buffer 132 may be output to the TTS speculation buffer 142 without processing of the transcript by the dialog generation module 130. For example, if the dialog generation module 130 has previously generated a dialog response for an intent expressed by the transcript of the first user and the system 100 determines that the intent expressed by a subsequent transcript of the first user is the same or substantially the same, it may be unnecessary for the dialog generation module 130 to also generate a dialog response for the intent expressed by a subsequent transcript of the first user. As another example, when the first user has interacted with the system 100 to check-in for some offering and the second user begins interacting with the system 100 to also check-in for some offering, the dialog generation module 130 may have previously generated a dialog response for an intent expressed by the transcript of the first user. For example, the dialog response may be an acknowledgement of the intent of the user (e.g., such as "Sure, I'll help you check in."), a query for information for aiding the user (e.g., such as "Sure, what is your reservation number?"), or any other dialog which may be suitable in response to the intent of the user. As such, it may be unnecessary for the dialog generation module 130 to also generate a dialog response for an intent expressed by the transcript of the second user when the intent expressed by the transcript of the first user and the second user are the same, or substantially the same.

When the intent does not match an input of an input-output pair stored in the dialog generation speculation buffer 132, a buffer miss may occur, and the dialog generation speculation buffer 132 may pass the intent to the dialog generation module 130 for processing by the dialog generation module 130. The dialog generation module 130 processes the intent to generate a dialog response appropriate for the intent of the user and the capabilities of the system 100. For example, for the first portion of the verbal input shown above (e.g., "Hi, may I") and for which the NLP module 120 may determine an intent of the user is to issue a greeting, the dialog generation module 130 may generate a dialog response of "Hello." However, for the second and third portions of the verbal input shown above (e.g., "Hi, may I check" and "Hi, may I check in, please?") and for which the NLP module 120 may determine that an intent of the user is to check in to an offering using the system 100, the dialog generation module 130 may generate a dialog response acknowledging the intent of the user and/or querying the user for information for use in aiding the user, as discussed above. The dialog generation module 130 determines the intent, in some embodiments, using any suitable dialog and/or conversational process or processing, a scope of which is not limited herein. In some embodiments, the dialog generation module 130 may also update a state of a finite state machine that represents current progress of a conversation between the system 100 and the user, as discussed in greater detail below. After generating the dialog response, the dialog generation module 130 passes the dialog response back to the dialog generation speculation buffer 132 for storage by dialog generation speculation buffer 132. In some embodiments, the dialog response is associated with the intent in the dialog generation speculation buffer 132 such that the intent and the dialog response form an input-output data pair. The dialog response may then be output by the dialog generation speculation buffer 132 to the TTS speculation buffer 142 for further processing by the system 100 for generation of the automatic dialog response.

Upon receipt of the dialog response from the dialog generation speculation buffer 132, the TTS speculation buffer 142 stores the dialog response and determines whether an audio file associated with the dialog response has been previously generated by the system 100 and stored in the TTS speculation buffer 142 (or alternatively, stored elsewhere with a location identifier or pointer stored in the TTS speculation buffer 142). When the dialog response matches an input of an input-output data pair of the TTS speculation buffer 142, a buffer hit may occur and the output of the input-output pair stored in the TTS speculation buffer 142 may be output by the system 100 without processing of the dialog response by the TTS module 140. For example, the output may be output to the output device 160 for presentation to the user (e.g., as audio and/or video). For example, if the TTS module 140 has previously generated an audio file for a generated dialog response and the system 100 determines that the a subsequently generated dialog response is the same or substantially the same, it may be unnecessary for the TTS module 140 to also generate an audio file for the subsequently generated dialog response. As another example, when the first user has interacted with the system 100 to check-in for some offering and the second user begins interacting with the system 100 to also check-in for some offering, the TTS module 140 may have previously generated an audio file for a dialog response. As such, it may be unnecessary for the TTS module 140 to generate a second audio file for a dialog response for the second user when the dialog response for the first user and the second user are the same, or substantially the same.

When the dialog response does not match an input of an input-output pair stored in the TTS speculation buffer 142, a buffer miss may occur, and the TTS speculation buffer 142 may pass the intent to the TTS module 140 for processing by the TTS module 140. The TTS module 140 processes the dialog response to generate an audio file for output by the system 100. After generating the audio file, the TTS module 140 passes the audio file back to the TTS speculation buffer 142 for storage by the TTS speculation buffer 142. In some embodiments, the audio file is associated with the dialog response in the TTS speculation buffer 142 such that the dialog response and the audio file form an input-output data pair. The audio file may then be output by the system 100 from the TTS speculation buffer 142, for example, via the output device 160.

In some embodiments, at least some of the modules of the system 100 may output a plurality of outputs in response to receipt of an input. For example, the STT module 110 may output a plurality of possible transcripts for a received audio file, the NLP module 120 may output a plurality of possible intents for a received transcript, and/or the dialog generation module 130 may output a plurality of dialog responses for a received intent. In each such embodiment, each of the plurality of outputs may be stored in a respective speculation buffer as discussed above and processed independently. In some embodiments, each of the outputs may be associated with a confidence value that indicates a degree of confidence a respective module in an accuracy of a respective output. In this way, an increased number of input-output data pairs may be stored in the various speculation buffers of the system 100, thereby increasing a probability of a buffer hit and an amount of potential acceleration in automatically generating and presenting a dialog response to a user made possible at least in part according to the speculative processing disclosed herein.

In some embodiments, some, but not all, of the plurality of outputs may be processed according to the speculative processing disclosed herein. For example, processing the outputs may have an associated cost (e.g., cost of data transfer, power core cost, computing cost, time cost, etc.) which may weigh against the benefit of increasing the number of input-output data pairs stored in the various speculation buffers of the system 100. When a module of the system 100 outputs a plurality of outputs each having varying confidence levels, a metric may be determined for each of the plurality of outputs and only outputs for which the metric exceeds a threshold value may be processed according to the speculative processing disclosed herein. In some embodiments, the outputs may be grouped into a plurality of groups, where each group includes a number of outputs $N_G$ which require a same (or substantially same) data for use in the disclosed speculative processing, and each of the outputs in the group has a confidence value $F_i$. Each of the groups may have an associated cost, indicated as $C_G$, for acquiring the data. Speculative processing may then be performed for outputs belonging to groups satisfying the following Equation 1.

$$\sum_{i=1}^{N_G} \frac{F_i}{C_G} \geq \text{Threshold} \qquad \text{(Equation 1)}$$

In some embodiments, the system 100 further comprises a processor (not shown) configured to implement and/or execute one or more finite state machines. Each finite state machine may determine an action or next response of the system 100 based, at least in part, on the verbal input received from the user. For example, the system 100 may be implemented at an airport and configured to provide automated check-in services for users. In addition, the system 100 may also serve, for example, as an information database for providing users with information such as directions to restrooms, details about restaurants located in the airport, and/or other forms of information or services. Each of the different services may be associated, in some embodiments, with a different branch of the finite state machine. A response by the system 100 (e.g., a dialog response) may depend, at least in part, on which particular service the system 100 is providing at any given time, and thus which branch of the finite state machine is being followed. For example, if a user approaches the system 100 and states "Where is . . . " the system 100 may begin pre-fetching automatic dialog responses associated with directions to restrooms and/or information about restaurants located in the airport according to the speculative processing of the present disclosure. To pre-fetch the automatic dialog responses, in some embodiments, the system 100 looks at a next state of the finite state machine (e.g., a state to which the finite state machine will processed from its current state if a given input is received from the user) to determine and pre-fetch a dialog response associated with the next state.

However, the system 100 may not yet know whether the user wishes to find out directions to the restroom or information about the restaurants, and thus the system 100 may not wish to commit itself to one branch or another in the finite state machine, but instead may wish to peek at a next state to pre-fetch the dialog response associated with the next state. For example, if the user asks where to find a particular type of food, the system 100 may have pre-fetched multiple responses by the time the user finishes asking the question. For example, the system 100 may ask the user if the user is in a hurry or wishes to take his or her time. Based on the user's response, the system 100 may provide information about sit-down restaurants in the airport offering the requested type of food or about grab-and-go restaurants in the airport offering the requested type of food. To accelerate an ability of the system 100 to provide the information about each restaurant type, prior to receiving the user's input indicating whether the user is in a hurry or wishes to take his or her time the system 100 may wish to pre-fetch dialog responses associated with each branch of the finite state machine (e.g., both a branch associated with an input of "in a hurry" and a branch associated with an input of "take my time"). However, because the system 100 does not yet know what input the user will provide, the system 100 may not wish to actually move the finite state machine into one of the branches. Instead, the system 100 may peek into a next state of the finite state machine to pre-fetch the dialog responses.

In some embodiments, peeking into a next state may be facilitated through software instructions. For example, a peek method configured to provide the peeking functions without causing a transition in the finite state machine may be coded into software of the modules of the system 100 and available via APIs, coded into software of the speculation buffers, coded into client software, etc. In other embodiments, the system 100 may comprise a plurality of speculative finite state machines. Each of the speculative finite state machines may operate in parallel with the finite state machine which is directly determining responses to provide to the user (referred to as the primary state machine). When the primary state machine transitions from a first state to a second state, each of the speculative finite state machines also transition to the second state and a transition history is updated to reflect the change in state of the primary state machine. When the system 100 wishes to perform a peek into a third state, one of the speculative finite state machines transitions from the second state to the third state to pre-fetch dialog responses associated with the third state. When the system 100 determines that the third state is not a correct state according to input received from the user (e.g., the third state corresponds to "in a hurry" as discussed above while the user's input corresponds to "take my time"), the speculative finite state machine which is at the third state may be reset and may automatically transition according to the transition history until the speculative finite state machine is again at a same state as the primary state machine. When the system 100 determines that the third state is the correct state according to input received from the user, the primary state machine may transition to the third state (e.g., perform a commit) and a dialog response associated with the third state and which was pre-fetched using the speculative finite state machine may be presented to the user.

Referring now to FIG. 2, a diagram 200 of speculative processing in accordance with various embodiments is shown. The diagram 200 illustrates speculative processing which may be performed, for example, by the system 100 when input (e.g., verbal input) is received from a user. The speculative processing may be divided into speculative execution stages 202A, 202B, and 202C (while three speculative execution stages are illustrated in FIG. 2, in practice a number speculative execution stages may be, at least partially, dependent on a length of the input received from the user, and may be less than, or greater than, three) and final execution stages 204. The speculative execution stages 202 occur after the system 100 has begun receiving input from the user but before the system 100 determines that the user has completed providing the input. The speculative execution stages 202A, 202B, and 202C execute to pre-fetch dialog responses according to an intent of the user determined by the system 100 according to an analysis of the input received by the user up to that particular point in time. The final execution stage 204 occurs when the system 100 determines that the user has completed providing the input and executes to provide actual responses to the user.

As shown in FIG. 2, at operation 205 the system 100 receives speech from a user as input. In some embodiments, the speech is received as in a waveform audio file format, while in other embodiments the speech may be received in any suitable audio format. As the speech is received from the user, the system 100 progressively processes the speech input at operations 210A, 210B, 210C, and 210D to convert the speech into text until the system 100 determines that the speech has ended (e.g., as indicated by a pause in the speech extending for a predetermined time period such as, in some embodiments, one second). The operations 210A, 210B, 210C, and 210D are performed, for example, by an STT module such as the STT module 110 of FIG. 1. At operations 215A, 215B, 215C, and 215D, the system 100 determines an intent of the user according to the text resulting from the operations 210A, 210B, 210C, and 210D, respectively. The operations 215A, 215B, 215C, and 215D are performed, for example, by an NLP module such as the NLP module 120 of FIG. 1. In some embodiments (e.g., as illustrated at operation 210D), an intent of the user may not have changed since a last speculative execution stage 202A-202C was executed. In such embodiments, a previously determined intent may be used by the system 100 (e.g., by retrieving the previously determined intent from a speculation buffer) rather than determining a new intent using a NLP module.

At operations 220A, 220B, 220C, and 220D, the system 100 generates a dialog response according to the intent determined at operations 215A, 215B, 215C, and 215D, respectively. The operations 220A, 220B, 220C, and 220D are performed, for example, by a dialog generation module such as the dialog generation module 130 of FIG. 1. In some embodiments (e.g., as illustrated at operation 220C and 220D), an intent of the user may not have changed since a last speculative execution stage 202A-202C was executed. In such embodiments, a previously generated dialog response may be used by the system 100 (e.g., by retrieving the previously generated dialog response from a speculation buffer) rather than generation of a new dialog response using a dialog generation module.

At operations 225A, 225B, 225C, and 225D, the system 100 generates an audio file or other output according to the dialog generated at operations 220A, 220B, 220C, and 220D, respectively. In some embodiments, the audio file is generated in a waveform audio file format, while in other embodiments the audio file may be generated in any other suitable audio format. The operations 225A, 225B, 225C, and 225D are performed, for example, by a TTS module such as the TTS module 140 of FIG. 1. In some embodiments (e.g., as illustrated at operation 225C and 225D), a dialog response may not have changed since a last speculative execution stage 202A-202C was executed. In such embodiments, a previously generated audio file may be used by the system 100 (e.g., by retrieving the previously generated audio file from a speculation buffer) rather than generation of a new audio file using a TTS module.

By executing the speculative execution stages 202A, 202B, and 202C prior to completion of the receipt of input from the user and execution of the final execution stage 204 and reusing previously determined or generated data, the system 100 may provide a dialog response to the user more quickly than a system which lacks the speculative execution stages 202A, 202B, and 202C. For example, for a system including only the final execution stage 204, a delay or latency ($L_{base}$) between completion of the receipt of input from the user and the system providing a dialog response to the user may be a summation of the delays of each of the operations 210D, 215D, 220D, and 225D (or more generally, a summation of the delays for each individual stage in the respective system), where each of the operations 210D, 215D, 220D, and 225D executes fully without reusing previously determined or generated data. In contrast, system 100 according to the various embodiments herein may provide a dialog response to the user more rapidly after completion of the receipt of input from the user. For example, in at least some embodiments a latency ($L_{spec}$) in the system 100 may be approximated according to the following Equation 2, in which $M_i$ is the probability of mismatch for the final execution in operation i (e.g., previously determined or generated data is not available for reuse by the respective operation i), $T_i$ represents the time difference between initiation of the final execution stage 204 and the initiation of the speculative execution stage 202A, 202B, or 202C that wrote the speculation buffer for operation i, and $M_S$ and $\Delta T_S$ (for "S+1"th stage) are constants where $M_S$=0 and $\Delta T_S$=0. It should also be noted that the below Equation 2 assumes that delays of the respective operations are independent of the input and $M_S$ and $\Delta T_S$ are dummy variables used to represent the case where no match is found in all stages and therefore $L_{spec}$=$L_{base}$.

$$L_{spec}=\Sigma_{0 \leq i \leq S}((\Pi_{0 \leq j \leq i} M_j)(1-M_i)(\max(L_{base}-\Delta T_i, 0))) \quad \text{(Equation 2)}$$

As discussed above with reference to FIG. 1, the various modules, and thereby the various operations of FIG. 2, may be executed by a processor. To execute the modules and operations, the processor may execute one or more instructions. For example, FIG. 3 illustrates one embodiment of instructions for implementing speculative processing (e.g., the speculative executions stages 202A, 202B, and/or 202C and the final execution stage 204). It should be noted that the instructions illustrated in FIG. 3 are merely exemplary to provide for ease of understanding of execution of the speculative executions stages 202A, 202B, and/or 202C and the final execution stage 204 and are non-inclusive of the instructions that fall within the scope of this disclosure.

In some embodiments, the speech input received from the user may be classified into one of various types. For example, the speech may be short (e.g., such as when the speech contains fewer than six words) or long (e.g., when the speech contains greater than six words). When the speech is long, the speech may be classified as long-early (e.g., when an intent can be found early in the speech, such as in a first half of the speech) or long-late (e.g., when the intent can be found late in the speech, such as in a last half of the speech). In some embodiments, for example, when the speech is of the type long-early, an automatic dialog response may be ready for presentation to the user at about a time of completion of the user providing input to the system 100. In such embodiments, the system 100 may experience little, to substantially no, latency between completion of the user providing input to the system and the system presenting an automatic dialog response to the user. Such a reduction in delay may result in an improved user experience and a more realistic (e.g., such as more similar to human-to-human) conversational capability of the system 100.

Referring now to FIG. 4, a flowchart of a method 400 for performing speculative processing in accordance with various embodiments is shown. The method 400 may be implemented by a system, such as the system 100 of FIG. 1, to execute a speculative execution stage, such as the speculative execution stages 202A, 202B, and/or 202C, and/or the final execution stage, such as the final execution stage 204, each of FIG. 2, to perform speculative processing to automatically generate a dialog response when input is received from a user. The method 400 may be executed multiple times (e.g., as multiple instances of the method 400) concurrently, or consecutively. For example, the system may execute the method 400 for each intermediate STT result determined by the system and/or may execute the method 400 as a part of final execution stage while also executing the method 400 as a part of a speculative execution stage.

At operation 410, an STT result is obtained and passed to operation 420 as input to a next stage. The STT result may be an intermediate STT result (e.g., as provided by the STT module 110 of FIG. 1) that includes a portion of the user's input prior to the system determining that the user has completed providing input to the system or a final STT result including a totality of the user's input after the system has determined that the user has completed providing input to the system. For example, at stages 202A, 202B, and 202C of FIG. 2, intermediate STT results may be determined according to input received from the user up to that point in time, but before the system determines that the user has completed providing input and at stage 204 a final STT result may be determined according to a totality of the input received from the user.

At operation 420, the system determines whether an entry exists in a speculation buffer of a next stage in the speculative execution for the received input. For example, when the input is an STT result, the system determines whether an input for the STT result already exists in a speculation buffer of a NLP module, as discussed in greater detail above. As another example, when the input is an intent, the system determines whether an input for the intent already exists in a speculative buffer of a dialog generation module, as discussed in greater detail above. When the entry exists in the speculation buffer of the next stage in the speculative execution for the received input, the method 400 proceeds to operation 430.

At operation 430, the system obtains a speculative processing or pre-fetch result from a speculation buffer. For example, the speculative processing result may be a result determined or generated during a previous (or substantially concurrent) instance or execution of the method 400 for a speculative execution stage. In some embodiments, although an input was found in a speculation buffer at operation 420, the system may still be executing another instance of the method 400 to determine an output corresponding to the input such that the output corresponding to the input might not yet be present in the speculation buffer. In such embodiments, the operation 430 may include a delay or wait function during which time the system waits for the output corresponding to the input to be written to the speculation buffer according to the other instance of the method 400. From operation 430, the method 400 proceeds to operation 470.

Returning to operation 420, when the entry does not exist in the speculation buffer of the next stage in the speculative execution for the received input, the method 400 proceeds to operation 440. At operation 440, in some embodiments the system writes the input to the speculation buffer of the next stage in the speculative execution. For example, when the method 400 is executing as a part of a speculative processing stage, the input may be written into the speculation buffer of the next stage in the speculative execution. Optionally, when the method 400 is executing as a part of a final execution stage, the input may not be written into the speculation buffer and the method 400 may instead proceed directly from operation 420 to operation 450 (e.g., bypassing operation 440).

At operation 450, the system processes the input using a module of the system to determine an output for the stage. For example, when the input is a STT transcript, the module may be an NLP module that determines an intent expressed in the STT transcript. As another example, when the input is an intent, the module may be a dialog generation module that generates a dialog response appropriate for the intent.

At operation 460, in some embodiments, the system writes an output of the module of the stage to the speculation buffer along with a correspondence to the input from which the output resulted, at least in part. For example, when the method 400 is executing as a part of a speculative processing stage, the output may be written into the speculation buffer along with the correspondence. Optionally, when the method 400 is executing as a part of a final execution stage, the output may not be written into the speculation buffer along with the correspondence, and the method 300 may instead proceed directly from operation 450 to operation 470.

At operation 470, the system determines whether the stage is the last stage in the speculative execution or final execution (e.g., when the speculative execution or final execution generates an audio output for presentation to the user, is the stage a TTS stage and thereby a last stage). When the stage is not a last stage, the method 400 proceeds to operation 480.

At operation 480, the system determines one or more outputs for a next stage in the speculative execution or the final execution. For example, in some embodiments the module executed at operation 450 to determine an output for the stage may have determined or generated a plurality of outputs. Each of the outputs may include a corresponding confidence level indicating a confidence of the module in an accuracy of the output. The system may determine, at operation 480, only a portion of the plurality of outputs to provide to a next stage in the system, for example, according to the threshold calculation of Equation 1, discussed above. After determining the outputs to provide to a next stage in the system, the method 300 may proceed to operation 420.

Returning to operation 480, when the stage is a last stage, the method 400 proceeds to operation 490. At operation 490, the system may commit changes (e.g., transition a finite state machine that follows a progress of a conversation between the system and the user to a next state) and present an output to the user. The output may be audible, visual, or any other form of output as discussed in greater detail above.

While the operations of the method 400 have been discussed and labeled with numerical references, it should be noted that the method 400 may include additional operations that are not recited herein, any one or more of the operations recited herein may include one or more sub-operations, any one or more of the operations recited herein may be omitted, and/or any one or more of the operations recited herein may be performed in an order other than that presented herein (e.g., in a reverse order, substantially simultaneously, overlapping, etc.), all of which is intended to fall within the scope of the present disclosure.

Figure 5:
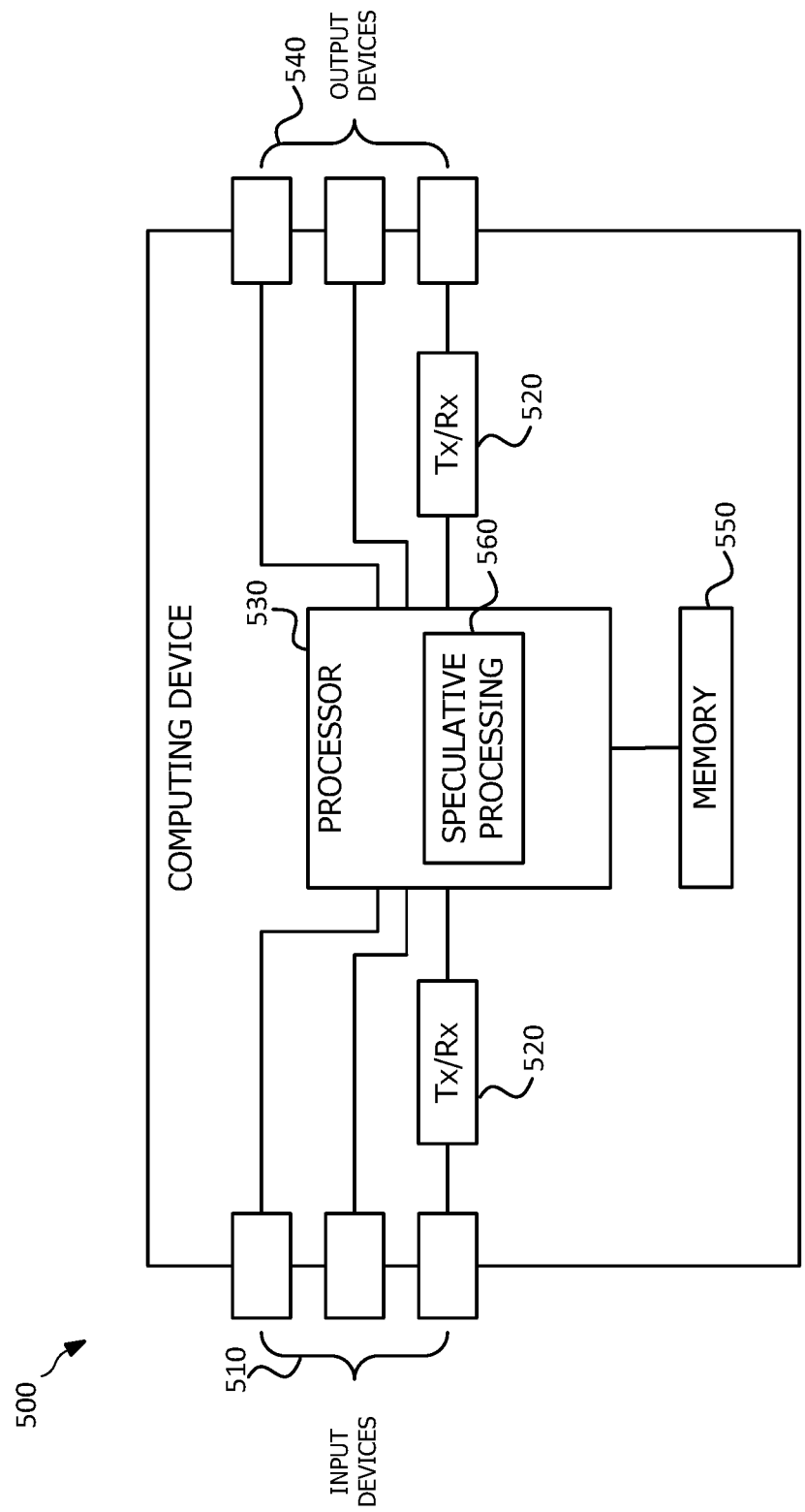
FIG. 5 depicts a computing device in accordance with various embodiments.

With reference now to FIG. 5, a schematic diagram of a computing device 500 according to various embodiments is shown. Computing device 500 may be any suitable processing device capable of performing the functions disclosed herein such as a computer system, a server, a cloud computing node, or may be generally representative of a distributed computing device in which one or more components of computing device 500 are distributed or shared across one or more devices. Computing device 500 is configured to implement at least some of the features/methods disclosed herein, for example, the speculative processing of system 100, diagram 200, instructions 300, and/or method 400, discussed above. In various embodiments, for instance, the features/methods of this disclosure are implemented using hardware, firmware, and/or software (e.g., such as software modules) installed to run on hardware.

Computing device 500 is a device (e.g., a user input device, a computer system, a user equipment, an end-user device, a cloud computing node, an autonomous response generator, an automated assistant, a robotic system, etc.) that receives input originating from a user, processes the input to determine a response to present to the user, and presents the response to the user. The computing device 500 may be an all-in-one device that receives the input, performs the processing, and outputs the response to the user, or the computing device may be a node that receives the input, performs any amount of processing (e.g., none, some, or all), transmits at least a portion of information related to the input to another device for processing, receives data from the another device, and presents a response to the user. In one embodiment, the computing device 500 is an apparatus and/or system configured to implement the speculative processing of system 100, diagram 200, instructions 300, and/or method 400, for example according to a computer program product executed on, or by, at least one processor.

The computing device 500 comprises one or more input devices 510. Some of the input devices 510 may be microphones, keyboards, touchscreens, buttons, toggle switches, or any other device or component that allows a user to interact with, and provide input to, the computing device 500. Some other of the input devices 510 may be downstream ports coupled to a transceiver (Tx/Rx) 520, which are transmitters, receivers, or combinations thereof. The Tx/Rx 520 transmits and/or receives data to and/or from other computing devices via at least some of the input devices 510. Similarly, the computing device 500 comprises a plurality of output devices 540. Some of the output device 540 may be speakers, a display screen (which may also be an input device such as a touchscreen), lights, or any other device that allows a user to interact with, and receive output from, the computing device 500. At least some of the output devices 540 may be upstream ports coupled to another Tx/Rx 520, wherein the Tx/Rx 520 transmits and/or receives data from other nodes via the upstream ports. The downstream ports and/or the upstream ports may include electrical and/or optical transmitting and/or receiving components. In another embodiment, the computing device 500 comprises one or more antennas (not shown) coupled to the Tx/Rx 520. The Tx/Rx 520 transmits and/or receives data from other computing or storage devices wirelessly via the one or more antennas.

A processor 530 is coupled to the Tx/Rx 520 and at least some of the input devices 510 and/or output devices 540 and is configured to perform speculative processing, for example, by processing partial voice inputs of a user to accelerate determination and generation of an automatic dialog response for presentation to the user. In an embodiment, the processor 530 comprises one or more multi-core processors and/or memory modules 550, which functions as data stores, buffers, etc. The processor 530 is implemented as a general processor or as part of one or more ASICs, field-programmable gate arrays (FPGAs), and/or digital signal processors (DSPs). Although illustrated as a single processor, the processor 530 is not so limited and alternatively comprises multiple processors. The processor 530 further comprises processing logic configured to execute a speculative processing computer program product 560 that is configured to process voice inputs of a user to determine and generate an automatic dialog response for presentation to the user, for example, according to the diagram 200, instructions 300, and/or the method 400, discussed above. In some embodiments, the speculative processing computer program product 560 comprises at least some of the STT module 110, the NLP module 120, the dialog generation module 130, and/or the TTS module 140.

FIG. 5 also illustrates that a memory module 550 is coupled to the processor 530 and is a non-transitory medium configured to store various types of data. Memory module 550 comprises memory devices including secondary storage, read-only memory (ROM), and RAM. The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 550 may be used to house the instructions for carrying out the various embodiments described herein. For example, the memory module 550 may comprise the speculative processing computer program product 560, which is executed by processor 530.

It is understood that by programming and/or loading executable instructions onto the computing device 500, at least one of the processor 530 and/or the memory module 550 are changed, transforming the computing device 500 in part into a particular machine or apparatus, for example, a speculative processing device having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by design rules well-known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
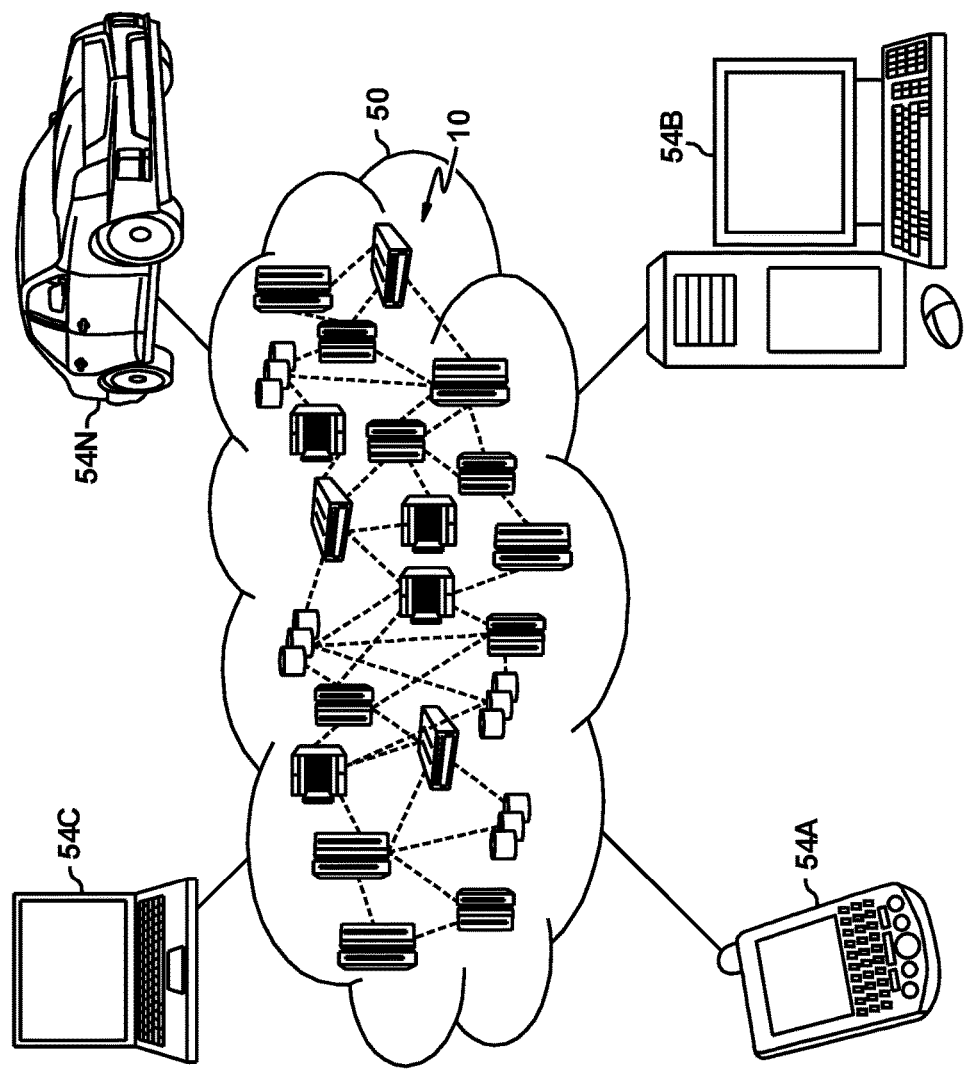
FIG. 6 depicts a cloud computing environment in accordance with various embodiments.
Figure 7:
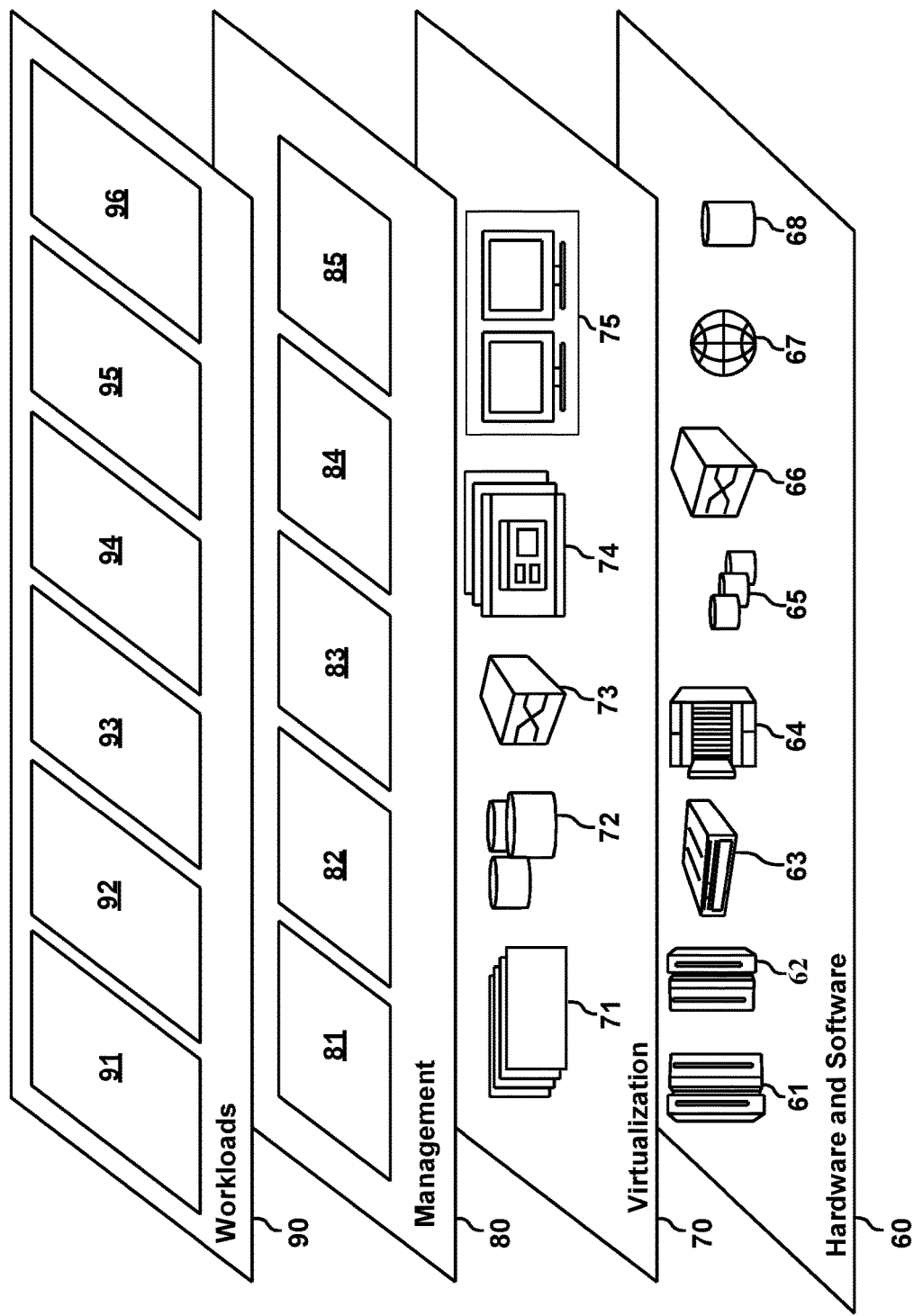
FIG. 7 depicts abstraction model layers in accordance with various embodiments.

Turning now to FIGS. 6 and 7, it is to be understood that although this disclosure includes a detailed description related to cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The cloud model characteristics may include on-demand self-service, broad network access, resource pooling, rapid elasticity, and/or measured service. On-demand self-service is a characteristic in which a cloud consumer can unilaterally provision computing capabilities, such as server time and network storage, as needed automatically without requiring human interaction with the service's provider. Broad network access is a characteristic in which capabilities are available over a network and accessed through standard mechanisms that promote use by heterogeneous thin or thick client platforms (e.g., mobile phones, laptops, and personal digital assistants (PDAs)). Resource pooling is a characteristic in which the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity is a characteristic in which capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service is a characteristic in which cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The cloud model Service Models may include Software as a Service (SaaS), Platform as a Service (PaaS), and/or Infrastructure as a Service (IaaS).

SaaS is a service model in which the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. PaaS is a service model in which the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. IaaS is a service model in which the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The cloud model Deployment Models may include private cloud, community cloud, public cloud, and/or hybrid cloud. Private cloud is a deployment model in which the cloud infrastructure is operated solely for an organization. It may be managed by the organization or a third party and may exist on-premises or off-premises. Community cloud is a deployment model in which the cloud infrastructure is shared by several organizations and supports a specific community that has shared concerns (e.g., mission, security requirements, policy, and compliance considerations). It may be managed by the organizations or a third party and may exist on-premises or off-premises. Public cloud is a deployment model in which the cloud infrastructure is made available to the general public or a large industry group and is owned by an organization selling cloud services. Hybrid cloud is a deployment model in which the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, illustrative cloud computing environment 50 is depicted. As shown, cloud computing environment 50 includes one or more cloud computing nodes 10 with which local computing devices used by cloud consumers, such as, for example, PDA or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. The hardware and software components of hardware and software layer 60 may serve as the underlying computing components on which cloud computing functions are executed in response to receipt of a request for performance of a function and/or service offered as a part of cloud computing environment 50 such as, for example, the speculative processing described above.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. These virtual entities may enable a subscriber to cloud computing environment 50 to interact indirectly with the hardware and software components of hardware and software layer 60 indirectly via virtual layer 70 without having a specific knowledge of, or interacting directly with, hardware and software layer 60. For example, a plurality of subscribers may interact with virtualization layer 70 to respectively access a corresponding plurality of virtual servers 71 and virtual storage 72 that all exist as separate threads, instances, partitions, etc. on a single server 62 and storage device 65, respectively. In such a scenario, virtualization layer 70 may cause each virtual server 71 and virtual storage 72 to appear to each subscriber as a dedicated and seamless computing and storage device, while enabling efficient operation of the hardware and software components of hardware and software layer 60 by reducing a potential for redundancy of components.

In one example, management layer 80 may provide the functions described below via an abstraction layer such that a subscriber to cloud computing environment 50 may interact with virtualization layer 70 and/or hardware and software layer 60 indirectly via management layer 80 without having a specific knowledge of, or interacting directly with, virtualization layer 70 and/or hardware and software layer 60. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA. Management layer 80 enables a subscriber to cloud computing environment 50 to interact with cloud computing environment 50 through management layer 80 to perform tasks and functions (e.g., administrative tasks) separate from actual execution of functions in the cloud computing environment 50. For example, an administrator may request access to a certain amount of computing resources (e.g., as provided in virtualization layer 70 and/or hardware and software layer 60) in cloud computing environment 50 via management layer 80 without having a specific knowledge of, or interacting directly with, virtualization layer 70 and/or hardware and software layer 60.

Workloads layer 90 provides examples of functionality for which the cloud computing environment may be utilized. The workloads and functions illustrated in workloads layer 90 are merely exemplary workloads and functions that may be executed in cloud computing environment 50 at the request or direction of a subscriber to cloud computing environment 50, and are not limited to those explicitly recited herein. Examples of workloads and functions which may be provided from this layer include: mapping and navigation 91; software development and lifecycle management 92; virtual classroom education delivery 93; data analytics processing 94; transaction processing 95; and speculative processing 96. These workloads and functions of workloads layer 90 may be end-user applications that enable a subscriber to cloud computing infrastructure 50 to interact with any of management layer 80, virtualization layer 70, and/or hardware and software layer 60 indirectly via workloads layer 90 without having a specific knowledge of, or interacting directly with, any of management layer 80, virtualization layer 70, and/or hardware and software layer 60. In this manner, the subscriber and/or an end user who accesses cloud computing infrastructure 50 may not require any form of specialized knowledge relating to the composition or operation of any of management layer 80, virtualization layer 70, and/or hardware and software layer 60 to perform the workloads and functions of workloads layer 90. In such a scenario, the workloads and functions of workloads layer 90 are said to be abstracted from management layer 80, virtualization layer 70, and hardware and software layer 60 because workloads layer 90 hides the underlying operation of management layer 80, virtualization layer 70, and hardware and software layer 60 from the subscriber and/or end-user while still enabling the subscriber and/or end-user to indirectly interact with management layer 80, virtualization layer 70, and/or hardware and software layer 60 to receive the computer processing benefits thereof via workloads layer 90.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other intervening devices and/or connections. Unless otherwise stated, "about", "approximately", or "substantially" preceding a value means+/−10 percent of the stated value or reference.

What is claimed is:

1. An apparatus comprising:
a memory; and
a processor coupled to the memory and configured to:
receive a speech input from a user;
process a first portion of the input via more than one service module, including at least a speech-to-text service module, while continuing to receive more of the input to determine a first speculative result, wherein processing the first portion of the input comprises executing at least one service module coupled to a corresponding speculation buffer;
process a second portion of the input via the more than one service module, including at least the speech-to-text service module, to determine a second speculative result, wherein processing the second portion of the input comprises executing the at least one service module coupled to the corresponding speculation buffer, wherein the second portion of the input includes the first portion of the input as well as more of the input not included in the first portion of the input;
process the input via the more than one service module, including at least the speech-to-text service module, to determine a final output, wherein processing the input comprises executing the at least one service module coupled to the corresponding speculation buffer, wherein the final output is the first speculative result when the second speculative result and the first speculative result are the same, and wherein the final output is the second speculative result when the second speculative result and the first speculative result are not the same; and
output the final output to the user.

2. The apparatus of claim 1, wherein the input is verbal input, and wherein processing the first portion of the verbal input comprises:
determining a first transcript of the first portion of the verbal input according to speech-to-text processing;
determining a first intent expressed in the first transcript of the first portion of the verbal input according to natural language processing;
generating a first dialog response corresponding to the first intent expressed in the first transcript of the first portion of the verbal input according to dialog response generation; and
generating a first speculative output according to the first dialog response.

3. The apparatus of claim 2, wherein processing the second portion of the verbal input comprises:
determining a second transcript of the second portion of the verbal input according to speech-to-text processing;
determining a second intent expressed in the second transcript of the second portion of the verbal input according to natural language processing;
generating a second dialog response corresponding to the second intent expressed in the transcript of the second portion of the verbal input according to dialog response generation when the first intent does not match the second intent;
using the first dialog response as the second dialog response when the first intent matches the second intent; and
generating a second speculative output according to the second dialog response.

4. The apparatus of claim 3, wherein the first speculative output is used as the second speculative output when the first dialog response is the same as the second dialog response.

5. The apparatus of claim 3, wherein the second speculative output is used as the final output.

6. The apparatus of claim 3, wherein processing the verbal input to determine a final result comprises:
determining a final transcript of the verbal input according to speech-to-text processing after an entirety of the verbal input is received;
determining a final intent expressed in the final transcript of the verbal input according to natural language processing when the final transcript does not match the second transcript;
using the second intent as the final intent when the final transcript matches the second transcript;
generating a final dialog response corresponding to the final intent expressed in the final transcript of the verbal input according to dialog response generation when the final intent does not match the second intent;
using the second dialog response as the final dialog response when the second intent matches the final intent; and
generating the final output according to the final dialog response.

7. A computer-implemented method comprising:
obtaining a speech-to-text (STT) result based on an input;
providing the STT result as input to a next stage of a speculative processing system;
determining whether the input exists in a speculation buffer of the next stage resulting from previous processing of a portion of the input;
obtaining a speculative processing result corresponding to the input from the speculation buffer when the input exists in the speculation buffer from the previous processing of the portion of the input;
providing the speculative processing result as a second input to a subsequent stage of the speculative processing system when the input exists in the speculation buffer;
processing the input to determine an output when the input does not exist in the speculation buffer; and
providing the output as the second input to the subsequent stage of the speculative processing system when the input does not exist in the speculation buffer.

8. The computer-implemented method of claim 7, further comprising writing the input to the speculation buffer before processing the input to determine the output when the input does not exist in the speculation buffer.

9. The computer-implemented method of claim 7, further comprising writing the output to the speculation buffer before providing the output as the input to the subsequent stage of the speculative processing system.

10. The computer-implemented method of claim 7, wherein processing the input to determine the output comprises generating an audio file of a dialog response determined at least in part according to the speculative processing result.

11. The computer-implemented method of claim 7, wherein the subsequent stage of the speculative processing system is an output stage configured to play an audio file when the audio file is the input to the subsequent stage of the speculative processing system.

12. The computer-implemented method of claim 7, wherein the STT result is a partial STT result for a portion of a verbal input provided by a user, and wherein the STT result is obtained prior to a completion of the user providing the verbal input.

13. The computer-implemented method of claim 12, wherein the speculation buffer includes output determined according to processing of a previously received partial STT result.

14. A computer program product for performing domain adaptation of a domain, the computer program product comprising a computer readable storage medium having program instructions embodied therewith, the program instructions executable by a processor to cause the processor to:
   receive an input from a user;
   perform speech-to-text (STT) processing to determine a transcript of the input;
   perform natural language processing (NLP) to determine an intent expressed by the transcript;
   determine an output corresponding to the intent and a speculative processing result of a portion of the input, wherein the speculative processing result is a result of speculative processing of the portion of the input determined before an entirety of the input is received, wherein the output corresponds to the speculative processing result when the speculative processing result corresponds to the intent, and wherein the output corresponds to the intent when the speculative processing result does not correspond to the intent; and
   transmit the output to an output device to cause presentation of the output to the user.

15. The computer program product of claim 14, wherein the input is a verbal input, and wherein executing the program instructions further causes the processor to:
   perform STT processing on the portion of the verbal input to determine a transcript of the portion of the verbal input;
   perform NLP on the transcript of the portion of the verbal input to determine an intent expressed by the transcript of the portion of the verbal input;
   generate a dialog response according to the intent expressed by the transcript of the portion of the verbal input; and
   generate an audio file according to the dialog response.

16. The computer program product of claim 15, wherein determining the output corresponding to the intent and the speculative processing result of the portion of the verbal input comprises using at least one of the intent expressed by the transcript of the portion of the verbal input, the dialog response, or the audio file in determining the output corresponding to the intent.

17. The computer program product of claim 15, wherein executing the program instructions further causes the processor to present the output to the user by playing the audio file via a speaker.

18. The computer program product of claim 14, wherein the input is a verbal input, and wherein executing the program instructions further causes the processor to:
   perform second STT processing on a second portion of the verbal input to determine a second transcript of the second portion of the verbal input;
   perform second NLP on the second transcript of the second portion of the verbal input to determine a second intent expressed by the second transcript of the second portion of the verbal input;
   generate a second dialog response according to the second intent expressed by the second transcript of the second portion of the verbal input; and
   generate a second audio file according to the second dialog response.

19. The computer program product of claim 18, wherein determining the output corresponding to the intent and the speculative processing result of the portion of the verbal input comprises using at least one of the second intent expressed by the second transcript of the portion of the verbal input, the second dialog response, or the second audio file in determining the output corresponding to the intent.

* * * * *